United States Patent

Rayburn

[11] Patent Number: 5,986,560
[45] Date of Patent: Nov. 16, 1999

[54] FORKLIFT WEIGHT SENSING DEVICE

[76] Inventor: Brutus Rayburn, 7542 Roster Dr., Baton Rouge, La. 70817

[21] Appl. No.: 09/184,930

[22] Filed: Nov. 2, 1998

[51] Int. Cl.[6] .................................................... G08B 21/00
[52] U.S. Cl. ........................... 340/685; 340/666; 177/136
[58] Field of Search ..................................... 340/666, 665, 340/685; 177/136, 140, 141, 211, 229, 139; 701/50

[56] References Cited

U.S. PATENT DOCUMENTS

| | | | |
|---|---|---|---|
| 1,689,644 | 10/1928 | Troll | 177/138 |
| 2,935,213 | 5/1960 | Cellitti et al. | 414/21 |
| 2,940,746 | 6/1960 | Anderson et al. | 177/146 |
| 3,059,710 | 10/1962 | Pien | 177/136 |
| 3,314,491 | 4/1967 | Nelson | 177/138 |
| 3,724,575 | 4/1973 | Kutsay | 177/211 |
| 3,993,166 | 11/1976 | Senour | 187/223 |
| 4,323,132 | 4/1982 | Bradley | 177/139 |
| 4,421,186 | 12/1983 | Bradley | 177/139 |
| 4,589,507 | 5/1986 | Curran | 177/138 |
| 4,606,419 | 8/1986 | Perini | 177/138 |
| 4,666,004 | 5/1987 | Raz | 177/139 |
| 4,899,840 | 2/1990 | Boubille | 177/139 |
| 5,861,580 | 1/1999 | Moore et al. | 177/136 |

OTHER PUBLICATIONS

A four-page brochure entitled "Forklift Weight Safety Control," authored by Brutus Rayburn and distributed in 1996 to various prospective manufactures. Since the publication was more than a year from the effective filing date this applciation will receive, the month of the publication is neither provided nor required. All four pages are relevant, but place of publication is not applicable, as the brochure was not published as part of any journal, magazine or other publication.

*Primary Examiner*—Daniel J. Wu
*Assistant Examiner*—Sihong Huang
*Attorney, Agent, or Firm*—Kenneth L. Tolar

[57] ABSTRACT

A weight sensing means for a forklift includes an elongated sleeve having a closed end and an open end in communication with an interior chamber. The interior chamber is dimensioned to receive a forklift lifting member. A weight sensing means is received within the interior chamber and is attached to the inner surface of the sleeve. The weight sensing means is in communication with a display means mounted on the forklift dashboard allowing a forklift operator to readily determine the weight of an object resting on the forklift blades. The weight sensing means is also in communication with an audible alarm means to alert a user whenever the lifting capacity of the forklift has been exceeded.

13 Claims, 5 Drawing Sheets

FORKLIFT WEIGHT SENSING DEVICE

BACKGROUND OF THE INVENTION

The present invention relates to a weight sensing device for forklifts which allows a forklift operator to readily and accurately determine the weight of an item resting on the forklift blades.

DESCRIPTION OF THE PRIOR ART

Forklifts have been used for years in warehouses, docks and similar shipping and storage facilities to relocate and reorganize inventory or to load and unload transportation vehicles. However, a forklift operator endangers himself and others if he unknowingly attempts to lift an object that is heavier than the forklift's lifting capacity. In addition, it is often desirable to quickly and accurately determine the weight of a particular shipment once placed on a transportation vehicle to determine transportation charges and to ensure complicity with various regulations.

The present invention satisfies the above described needs by providing a weight sensing device for encompassing a forklift blade that transmits a signal to a display means corresponding to the weight of an object resting thereon. Although various load indication means for vehicles exist in the prior art, none have the unique features and advantages according to the present invention. For example, U.S. Pat. No. 1,689,644 issued to Troll relates to a load gauging device for trucks that measures the distance that the vehicle springs are compressed.

U.S. Pat. No. 3,314,491 issued to Nelson relates to a load indicator device for measuring the deflection of a vehicle spring.

U.S. Pat. No. 4,589,507 issued to Curran relates to an on board scale for a truck or trailer including one or more pneumatic scale assemblies for selectively engaging freight items and recording their weight.

U.S. Pat. No. 4,606,419 issued to Perini relates to an air/hydraulic scale for use on a truck or trailer. The device includes frame mounted hydraulic cylinders with piston rods contacting a vehicle axle. Fluid expelled from the cylinders activates a load indicating displacement cylinder located adjacent thereto.

Although various weight measuring devices for vehicles exist in the prior art, none relate to a weight sensing and alarm means for a forklift. The present invention provides a sleeve that may be easily secured about a forklift blade having a weight sensing means integral therewith. The weight sensing means is in communication with a display means allowing the forklift operator to readily ascertain the weight of a load resting on the forklift blades.

SUMMARY OF THE INVENTION

The present invention relates to a weight sensing device for a forklift comprising an elongated, substantially rectangular sleeve member having an upper wall, a lower wall, two side walls, a closed first end and an open second end. The open end is in communication with an interior chamber dimensioned to receive a forklift blade. Received within the interior chamber and attached to the upper wall is a weight sensing means. The weight sensing means is in communication with a display means preferably mounted on the forklift dashboard. The weight sensing means and display means are connected with a wiring assembly that automatically dispenses and retracts a wire when the forklift blades are raised and lowered to the prevent the wire from tangling.

A second embodiment relates to a tubular sleeve for receiving a tubular arm on a forklift such as those commonly used in the textile industry. It is therefore an object of the present invention to provide a forklift weight sensing means which allows a forklift operator to readily ascertain the weight of an object resting on the forklift blades.

It is yet another object of the present invention to provide a forklift weight sensing means which assists a user in determining the total weight of a particular shipment.

It is yet another object of the present invention to provide a forklift weight sensing means having a unique wiring assembly that does not entangle when the forklift blades are raised or lowered.

Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
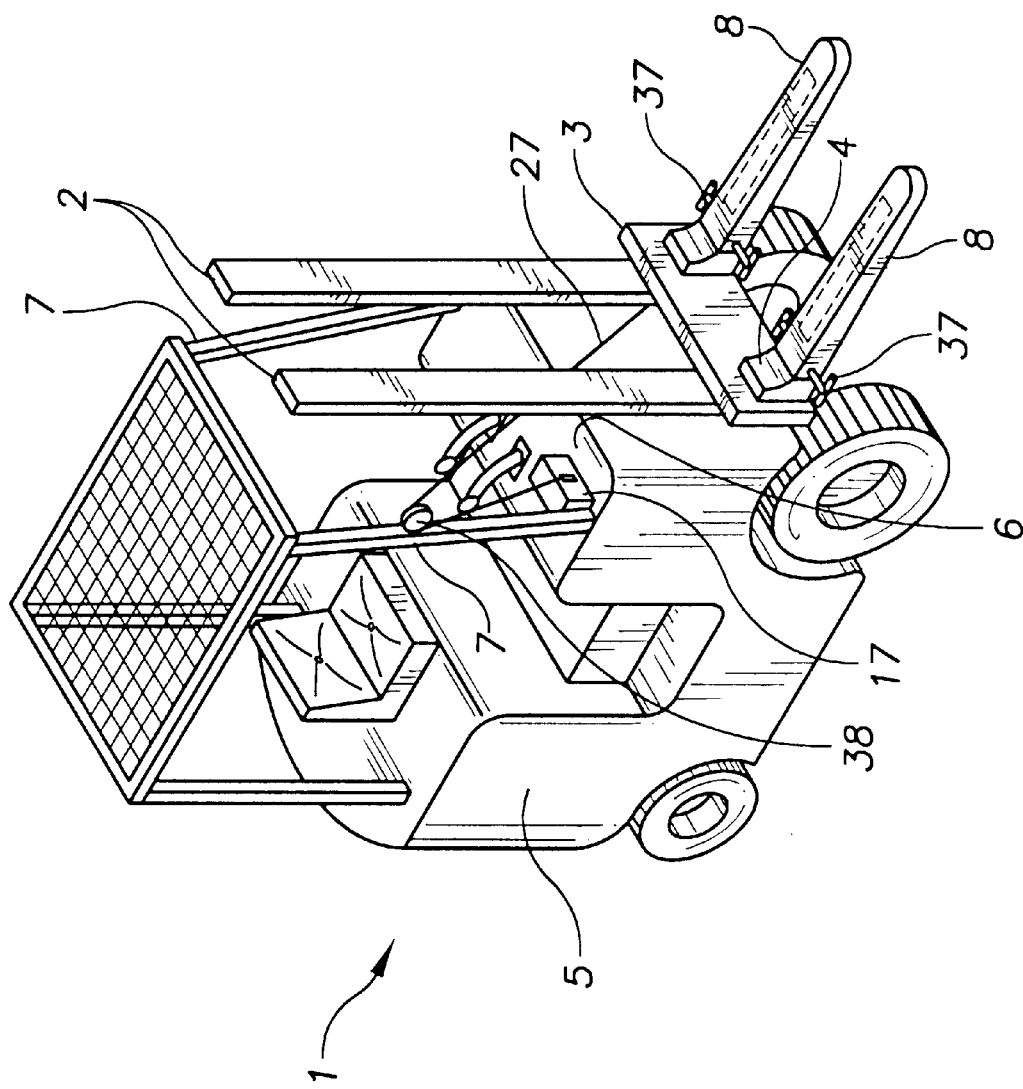
FIG. 1 is a perspective view of a forklift with the inventive device installed thereon.

Referring now to FIGS. 1 through 4, the present invention relates to a weight sensing device for a forklift. A forklift 1 typically includes a pair of vertically oriented mounting posts 2 each having a bracket 3 vertically movable thereon. A pair of lifting members 4 such as blades horizontally extend from the bracket. The blades are typically inserted into or beneath an object after which an actuator mechanism automatically lifts the blades to a desired height. The forklift also includes a passenger compartment 5 in which the operator sits and a dashboard 6 having various control levers thereon. Vertically extending from the dashboard are a pair of roof supports 7.

The present invention relates to a weight sensing device for mounting to each forklift blade as described above allowing the forklift operator to readily ascertain the weight of an object resting on the forklift blades. The invention comprises an elongated sleeve 8 having a substantially rectangular cross-sectional configuration. The sleeve includes a top wall, a bottom wall, two side walls perpendicularly disposed therebetween, a closed arcuate end 40 and an open end 41. The open end is in communication with an interior chamber dimensioned to receive a forklift blade. Received within the interior chamber and attached to the inner surface of the top wall is a weight sensing means 9 for transmitting a signal to a display means according to the weight of an object resting on the sleeve. Each sleeve has a plug type receptacle 36 on one of its walls adjacent its open end for coupling the weight sensing means with a display means.

The sleeve may be secured to the blades using one of two attachment means. The sleeve may include a pair of opposing, threaded apertures 11 adjacent its open end, each on one of the two opposing side walls. A T-bolt 37 or similar fastener means is received within each aperture and is tightened against the forklift blade to secure the sleeve thereto.

Figure 3:
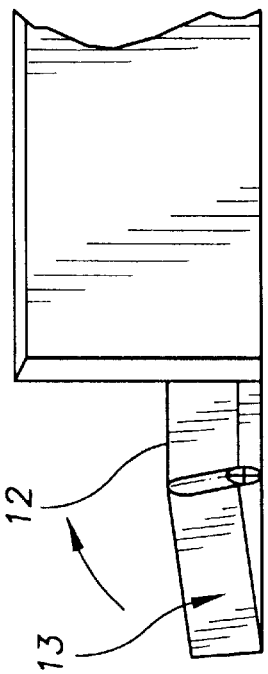
FIG. 3 depicts an alternative attachment means according to the present invention.
Figure 2:
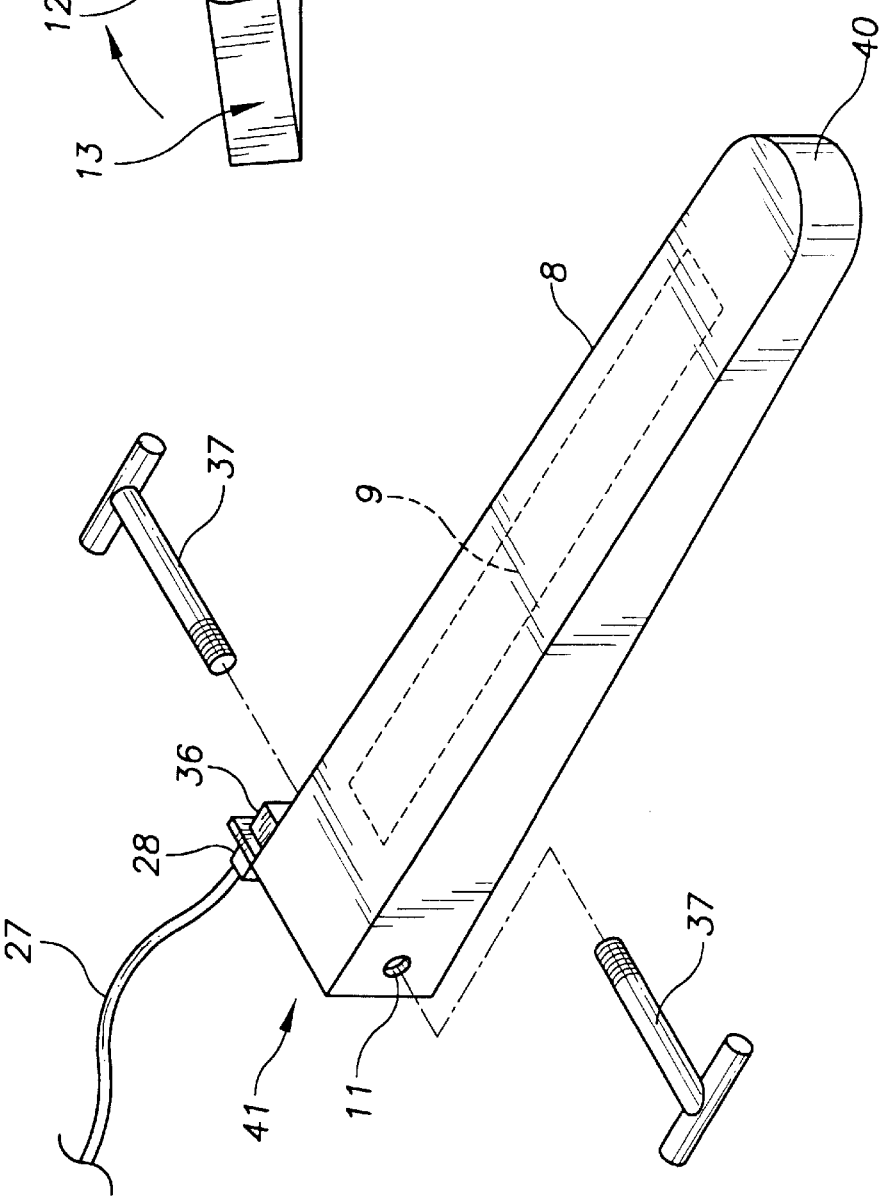
FIG. 2 is a perspective view of the sleeve and the associated weight sensor means that employs a first attachment means.

A second attachment means is depicted in FIG. 3. A panel 12 integrally co-extends from the bottom wall at its open end and has a terminal edge. Hingedly engaging the terminal edge is a flap 13 movable between a horizontal and vertical position. When the sleeve is installed on a forklift blade, the flap may be pivoted vertically until it abuts the back surface of a vertical post. The flap then locks in its vertical position to retain the sleeve on the blade.

The display means 14 includes a housing 15 having conventional circuitry therein that translates a signal from the weight sensing means into a weight value. A side of the housing includes a display screen 16 on which the weight value is visually displayed. The circuitry is also in communication with an audible alarm for audibly alerting a user whenever the weight resting on a sleeve exceeds a predetermined value. Preferably, the circuitry also includes means for determining when the weight on a first sleeve differs from that resting on the second sleeve by more than a predetermined amount. Accordingly, an audible alarm is emitted to warn an operator that a load on the blades is improperly balanced.

Figure 5:
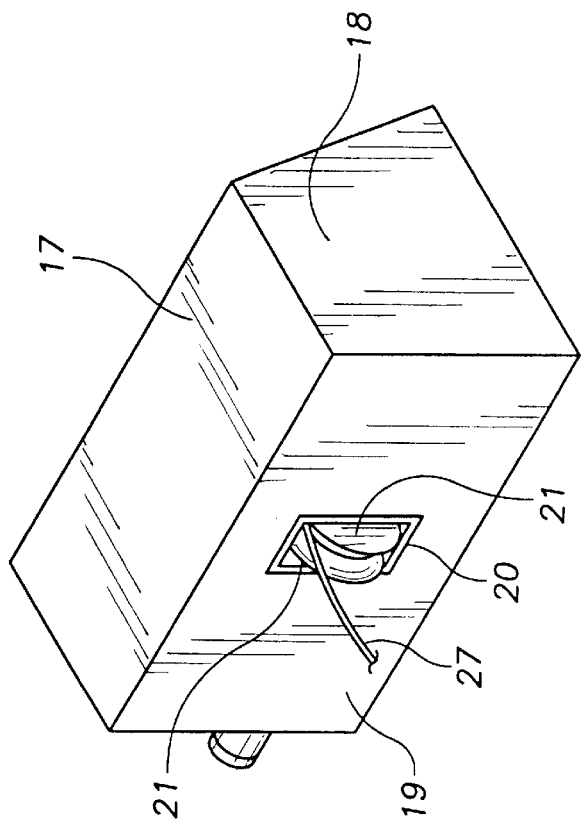
FIG. 5 is a perspective view of the wiring assembly according to the present invention.
Figure 4:
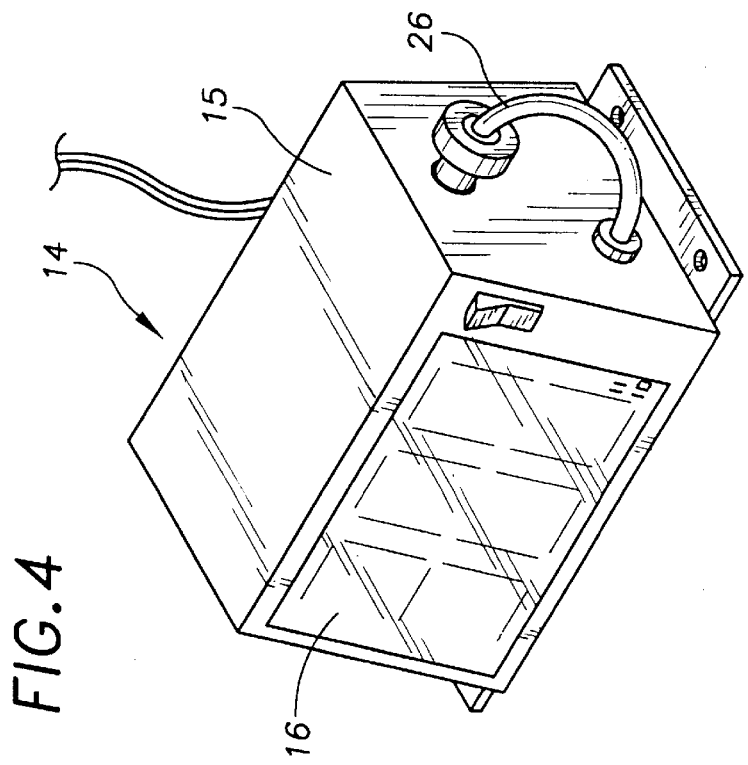
FIG. 4 is a perspective view of the digital display means according to the present invention.
Figure 6:
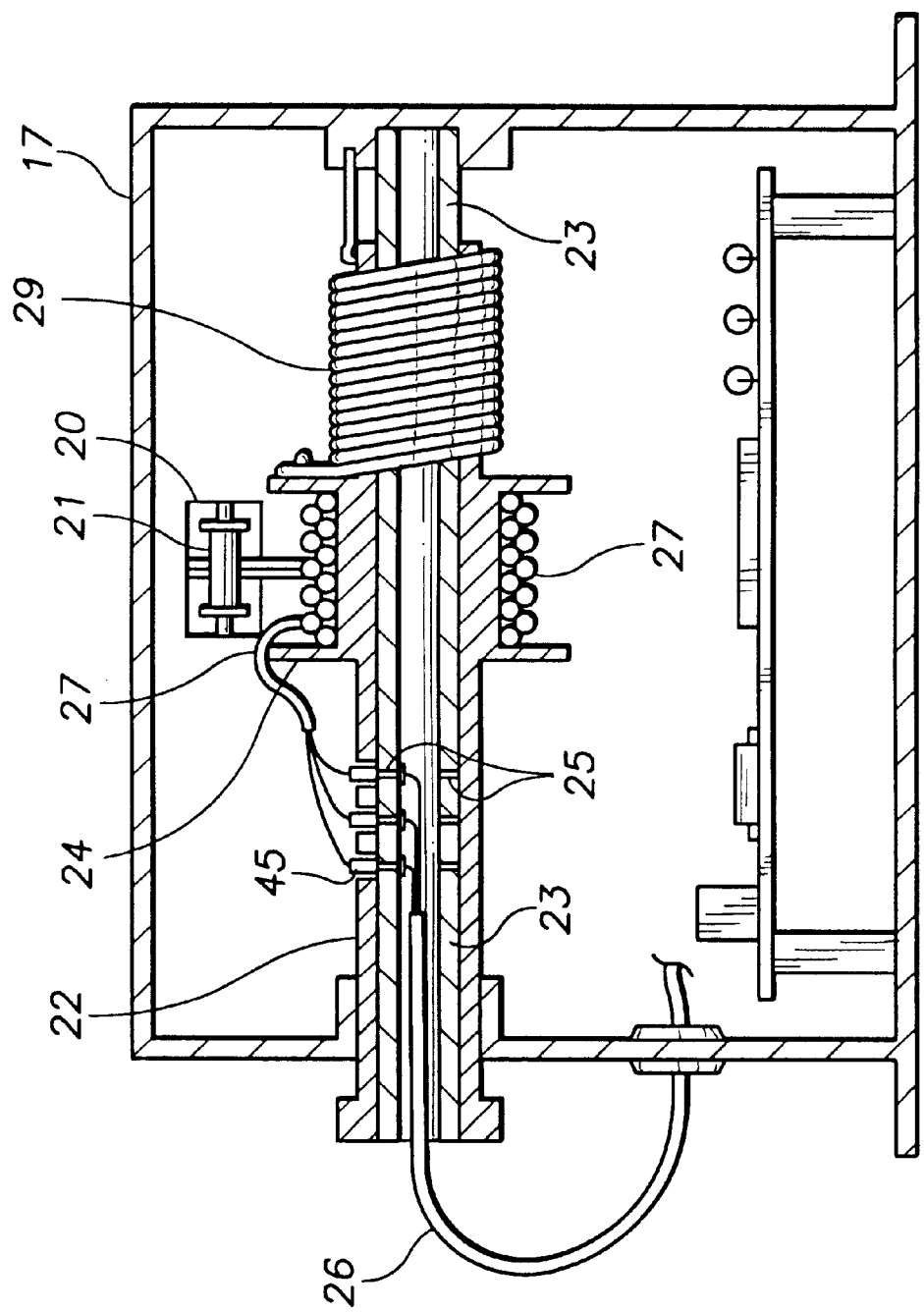
FIG. 6 is a cross-sectional view of the wiring assembly according to the present invention.

Now referring to FIGS. 5 and 6, a wiring assembly is depicted for establishing electrical communication between the weight sensing means and the display means. The wiring assembly is designed to dispense and retract a wire as the forklift blades are raised and lowered. The assembly includes a housing 17 disposed on the forklift dashboard adjacent the vertical posts. The housing includes a pair of opposing side walls 18, a front panel 19 having an aperture 20 thereon and a first pulley 21 rotatably mounted within the aperture.

A rod 22 is received within the housing and is rotatably coupled to opposing side walls with a spool 24 mounted thereabout. The rod rotates about a fixed, co-axial shaft 23 that form part of a brush connection for maintaining electrical communication between the display and the weight sensor as the rod rotates. The shaft has a plurality of continuous conductive paths 25 circumferentially disposed thereabout. A first wire 26 has a pair of terminal ends with a first end coupled with the display means circuitry. The second terminal end is received within a central bore on the internal shaft and is electrically coupled with the conductive paths 25. The first wire is supported externally from the housing with a second 38 pulley mounted on a vertical roof support.

A second wire 27 having a pair of terminal ends is helically wound about the spool and engages a portion of the first pulley. A first terminal end of the second wire has a plug member 28 thereon for selectively engaging the receptacle on the sleeve. The second terminal end includes a plurality of electrical connectors 45 received within apertures on the rod which slidably engage the conductive paths 25 on the shaft. Therefore, as the rod and spool rotate, electrical communication between the display means and the weight sensing means is maintained. A coil spring 29 encompasses the rod with a first end attached to the spool and the opposing end attached to a side wall of the housing to bias the rod in a predetermined angular direction. Accordingly, as the forklift blades are moved away from the display means, tension will be maintained on the second electrical wire preventing the wire from tangling or distorting. As the blades approach the display means, the wire is automatically retracted within the housing.

Figure 8:
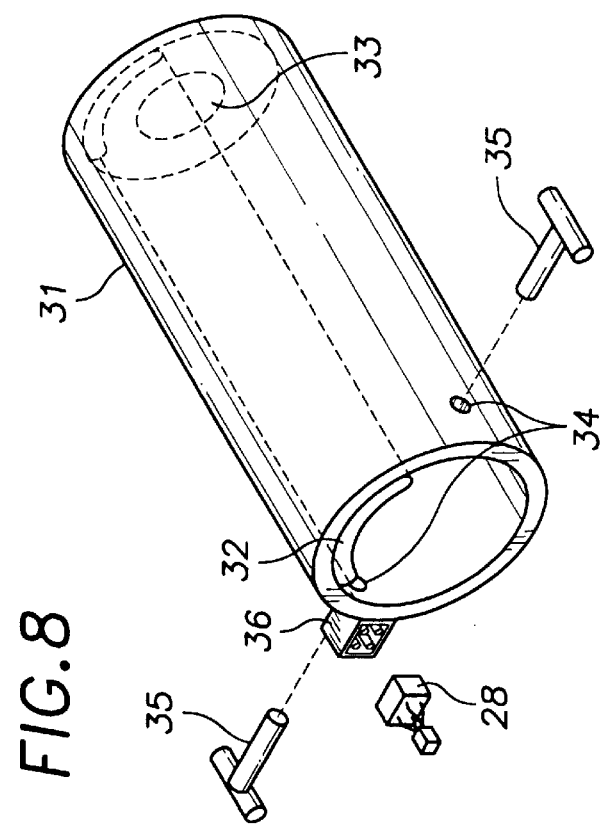
FIG. 8 is a perspective view of the second embodiment according to the present invention.
Figure 7:
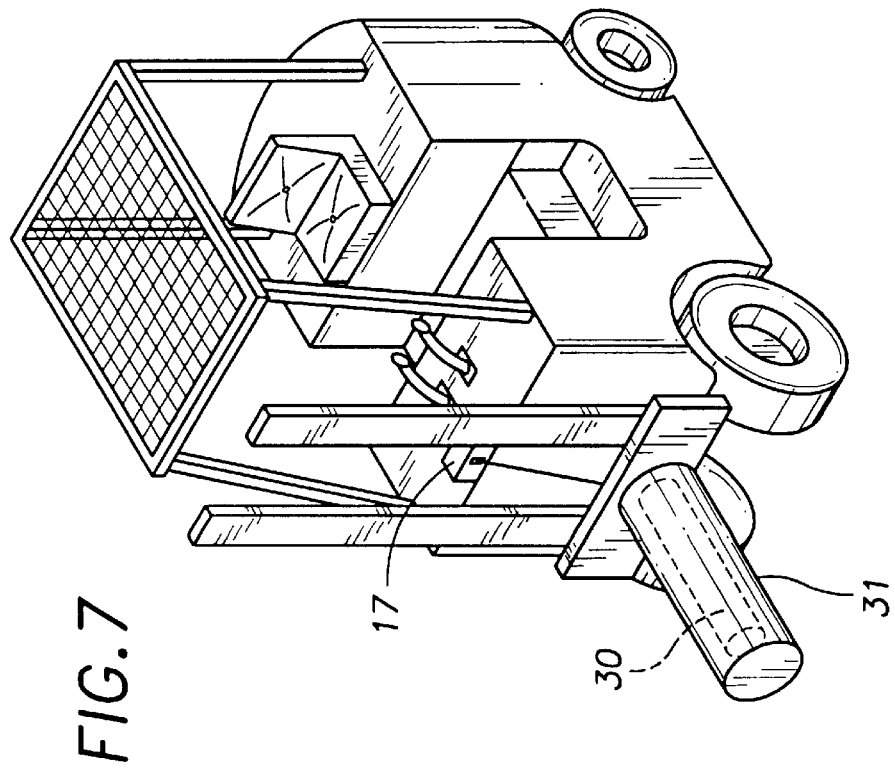
FIG. 7 depicts a forklift with a second embodiment installed thereon.

Now referring to FIGS. 7 and 8, a second embodiment according to the present invention is depicted. The second embodiment is particularly suitable for the textile industry in which a single lifting member is employed. Typically, the lifting member 30 relates to an elongated tubular arm dimensioned to be received within a central bore on a roll of carpet.

The second embodiment includes an elongated hollow cylindrical sleeve 31 comprising an outer wall, an inner wall, a closed end and an opposing open end in communication with an interior chamber. The interior chamber is dimensioned to receive the tubular arm. Received within the interior chamber and attached to a portion of the inner wall is a weight sensing means 32 similar to that described above. Preferably, the weight sensing means covers only a portion of the inner wall. Attached to the inwardly facing side of the closed end is a pressure sensor 33 in communication with the alarm means for emitting an audible alarm upon a predetermined amount of pressure being applied thereto. Accordingly, when a forklift operator is attempting to insert the sleeve within the carpet roll bore, an audible alarm will be emitted if the closed end of the sleeve collides with the tubular arm or the carpet roll. The aforementioned feature minimizes the destruction of carpet that often results when the forklift operator repeatedly and unsuccessfully attempts to insert the arm into the carpet bore.

As with the first embodiment, the cylindrical sleeve preferably includes a pair of opposing threaded apertures 34 adjacent its open end, each having a T-bolt 35 or similar fastener means received therein. The bolts are tightened against opposing portions of the tubular arm to secure the sleeve thereon.

The weight sensing means may relate to a conventional strain gauge in which resistance variations in a wire occur depending upon the amount of force applied thereto. The degree of resistance variation is proportional to the weight of the object exerting the force. The resulting electrical signal is transmitted to the display circuitry which translates the signal into a corresponding weight. However, other conventional weight detection means may also be used.

The sleeves are preferably constructed with stainless steel while the display and wiring assembly housings are preferably constructed with plastic. However, as will be readily apparent to those skilled in the art, the size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a forklift having a dash board, a pair of roof supports vertically extending from said dashboard, a pair of vertical support members and at least one horizontal lifting member extending from said support members and vertically movable therealong, a weight sensing means comprising:

an elongated hollow sleeve having a closed end and an opposing open end in communication with an interior chamber, said chamber dimensioned to receive said lifting member;

a weight sensing means integral with said sleeve for measuring the weight of an object resting thereon.

2. A device according to claim 1 further comprising:

a display means mounted on said dashboard and in communication with said weight sensing means for visually depicting the weight measured by said weight sensing means.

3. A device according to claim 2 further comprising:

a wiring assembly for establishing electrical communication between said weight sensing means and said display means.

4. A device according to claim 1 wherein said sleeve includes a planar top wall, a planar bottom wall, two parallel side walls perpendicularly disposed therebetween and is dimensioned to surround a substantially rectangular lifting member.

5. A device according to claim 1 wherein said sleeve is substantially cylindrical and is dimensioned to receive a substantially tubular lifting member.

6. A device according to claim 3 wherein said wiring assembly comprises:

a hollow housing having a front wall with an aperture thereon and two opposing side walls, said housing mounted on said dashboard;

a first pulley rotatably mounted within said front wall aperture;

a rod received within said housing and rotatably attached to the opposing side walls, said rod having a spool mounted thereabout;

a fixed shaft coaxially received within said rod, said shaft having an inner bore and a continuous conductive path thereon;

a first wire having a pair of terminal ends and an intermediate portion therebetween with a first end coupled with said display means and a second end received within said shaft bore and coupled with said continuous path;

a second wire having a pair of terminal ends and an intermediate portion therebetween with a first end electrically coupled to said weight sensing means and a second end slidably engaging said continuous conductive path, said intermediate portion of said second wire helically wrapped about said spool and engaging said first pulley.

7. A device according to claim 6 further comprising a second pulley mounted to a forklift roof support for supporting the intermediate portion of said first wire.

8. A device according to claim 6 further comprising:

a coil spring having two opposing ends, said spring encompassing said rod with a first end attached to said spool and the opposing end attached to a housing side wall to bias said spool in a predetermined angular direction.

9. A device according to claim 1 further comprising means for securing said sleeve on said forklift lifting member.

10. A device according to claim 9 wherein said securing means comprises:

a pair of opposing bolt means adjacent the open end of said sleeve for tightly engaging opposing sides of said forklift lifting member.

11. A device according to claim 4 further comprising:

a panel integrally co-extending from the bottom wall of said sleeve, said panel having a terminal edge with a flap hingedly attached thereto, said flap movable between a vertical position wherein said flap abuts a vertical support member and a horizontal position to release said sleeve from said lifting member.

12. A device according to claim 1 further comprising an audible alarm means in communication with said weight sensing means for audibly alerting a user that a load resting on said sleeve is greater than a predetermined value.

13. A device according to claim 1 further comprising a pressure sensor received within said sleeve interior chamber and attached to its closed end, said pressure sensor in communication with an alarm means for alerting a user when said closed end impacts an object with a predetermined amount of force.

* * * * *